Aug. 15, 1950  W. B. EDDISON ET AL  2,519,239
THERMOSTATIC CONTROL
Filed July 25, 1946  3 Sheets-Sheet 1
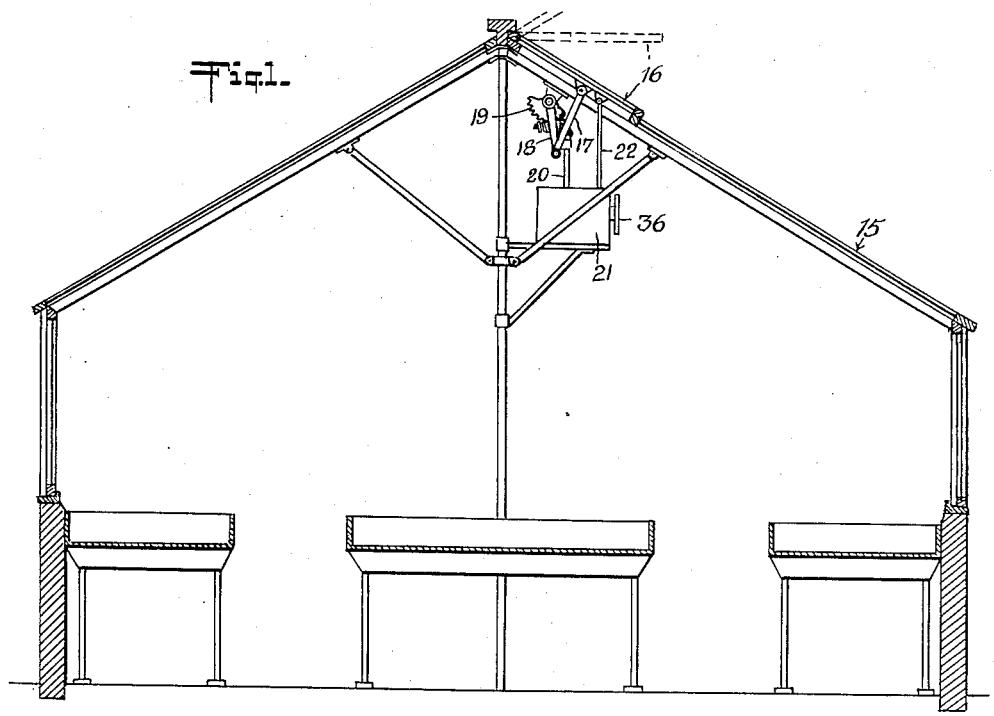
Fig.1.
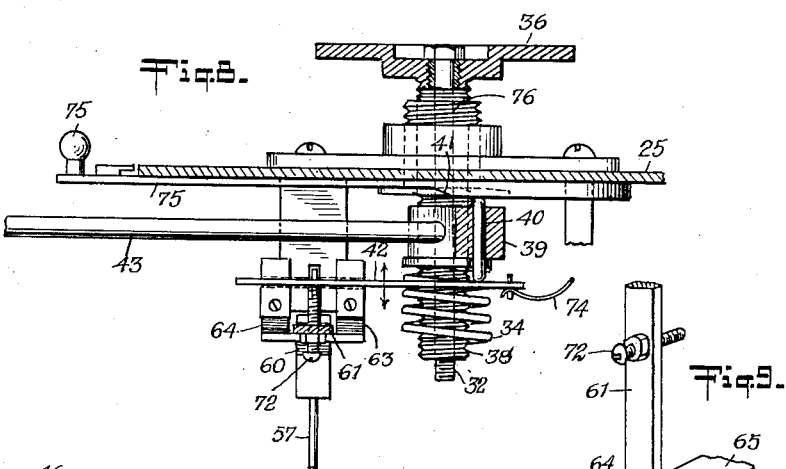
Fig.8.  Fig.9.
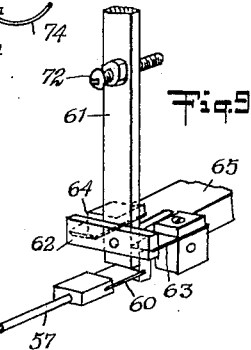
Fig.10.
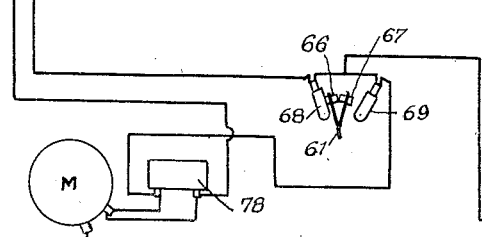
INVENTORS
William Barton Eddison
and Thomas E. King
BY
Munn, Liddy & Glaccum
Attorneys

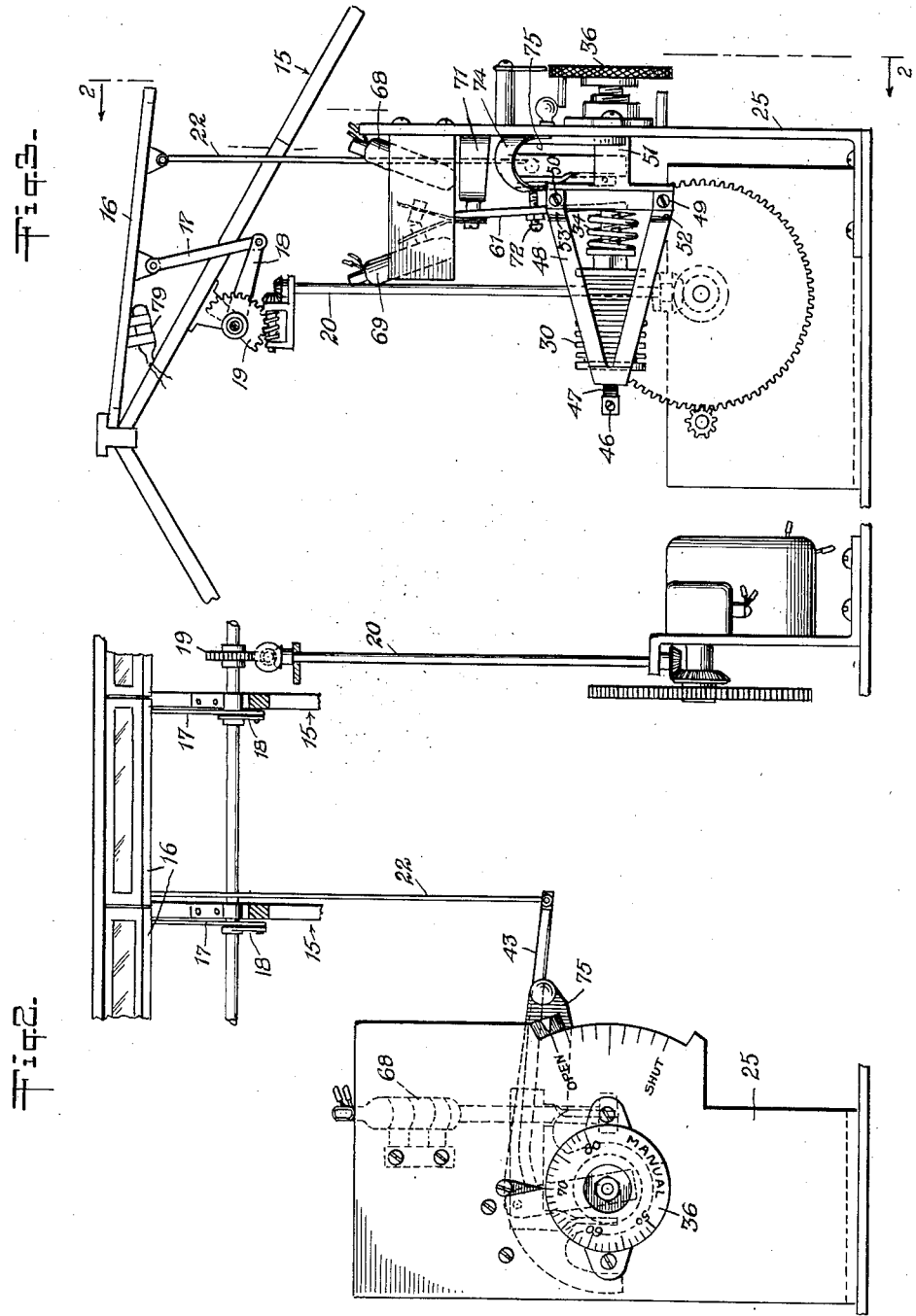

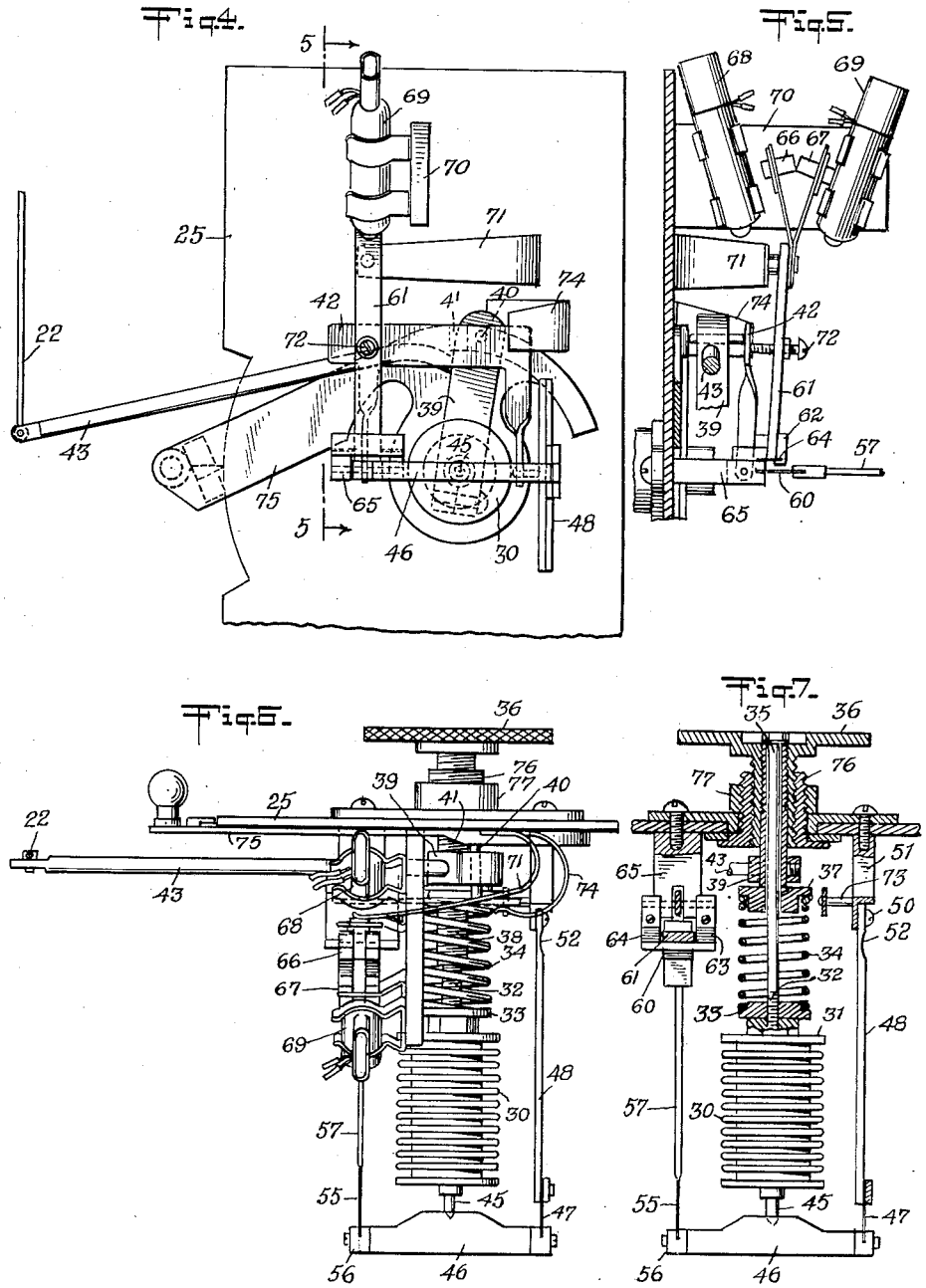

Patented Aug. 15, 1950

2,519,239

UNITED STATES PATENT OFFICE 2,519,239

THERMOSTATIC CONTROL

William Barton Eddison, Irvington, and Thomas E. King, Hartsdale, N. Y., assignors to Burnham Corporation, a corporation of New York Application July 25, 1946, Serial No. 686,172

8 Claims. (Cl. 236—49)

This invention relates to a control apparatus and more particularly to a temperature control apparatus. For the purpose of illustration we have shown our invention adapted to a greenhouse where temperature control is of the greatest importance. It will be understood, however, that the invention is not limited to use in greenhouses but is applicable to any use where accurate and sensitive control is desirable or required. This is true whether the control is used to actuate a heat creating mechanism or, as illustrated, ventilating equipment. In greenhouses, particularly, the temperature control is of extreme importance since a sudden drop in temperature may cause a commercial greenhouseman substantial loss. At the same time excessive heat is likewise undesirable. With our invention it is possible to control the temperature and to make adjustments for a fraction of a degree change in temperature.

One of the objects of this invention is to provide a control as outlined which will respond to minute changes in temperature but which will avoid actuating the ventilating apparatus to an extreme. With existing controls a drop of two or three degrees will cause the mechanism to close all ventilators with the result that within a very short period the temperature will rise above that desired and after a period the controls will open all ventilators. This, quite obviously, causes an undesired fluctuation of temperature throughout the greenhouse since there is always a time lag between the time the temperature rises and falls in one portion of the greenhouse and the time that this rise or fall reaches the thermostat. It is the purpose of this invention, therefore, to provide a control which will operate automatically through one-half degree cycles and which has a compensated mechanism to prevent it from going to extremes.

A further object of this invention is to provide a control mechanism which can be either automatically or manually operated and in which the automatic mechanism can be limited to a predetermined operation. In other words, in certain types of weather, such as windy weather, an operator may not want his ventilators to open to the full extent under any conditions. He can, however, set the controls so that they will operate automatically but only to the extent of opening the ventilators to a pre-determined position, such as one-third of the way open or one-half of the way open.

Other objects and advantages become apparent as the description proceeds.

As heretofore stated, for the purpose of illustration this description will deal with an installation of our controls in connection with greenhouse ventilators but this is purely for the purpose of description and not to limit in any way the use of the control.

In the accompanying drawing:

Fig. 1 is a sectional view of the greenhouse showing the ventilator construction.

Fig. 2 is a front view of our control showing the manner of installation.

Fig. 3 is a cross-sectional view.

Fig. 4 is a rear view of the control.

Fig. 5 is a sectional view taken on the line 5—5 of Fig. 4.

Fig. 6 is a detailed view showing the thermostatic means.

Fig. 7 is a view similar to Fig. 6 partly in cross-section.

Fig. 8 is a further view similar to Fig. 6 slightly enlarged and partly in section.

Fig. 9 is a detailed view of the flexure joints.

Fig. 10 is an outline of the circuit used.

Referring more particularly to the drawings, the conventional greenhouse 15 is provided with a roof ventilator 16 controlled by the arms 17, 18 and the pinion 19. This ventilator is usually operated by hand but may be geared by means of the shaft 20 to a motor enclosed in the cabinet 21. This illustration is purely for the purpose of explaining the invention, and the position of the motor with respect to the ventilators can be varied in many ways. Extending from the ventilator to the control mechanism is a rod 22, the purpose of which will be discussed hereafter.

Referring more particularly to Fig. 2 the control device has a face plate 25 on which is mounted the control unit which consists of a thermal element, a mechanism and two sensitive electric switches operated by the mechanism. The thermal element 30 consists of a metal bellows filled with methyl alcohol and acts by elongation with an increase in volume due to an increase in temperature. Its travel in practice is about $1/1000$ of an inch per degree Fahrenheit. It has an internal guide consisting of a spindle attached to the one end and a sleeve attached to the other to keep the element always in alignment. One end 31 of the thermal element 30 is attached to a small stainless steel rod 32. The steel rod 32 is threaded into the collar 33 which holds one end of a spring 34. The opposite end 35 of the rod 32 extends through the temperature setting knob 36. The spring 34 is positioned against the collar 37 on the threaded sleeve 38. Also mounted on the sleeve 38 is the collar 39 in which is positioned a pin or slug 40 engaging on one side a cam 41 positioned on the operating handle and on the other side a yoke 42. A modulating rod 43 controls the operation of the collar 39. The collars 37 and 39 are shown abutting but their relative position depends upon the setting of the collar 37. The collar 39 is fixed to the sleeve 38 so that when the modulating arm 43 is moved the collar 39 will rotate the sleeve 38.

At the opposite end of the bellows 30 a pin 45 engages the arm 46 which is connected by means of a flexure tension support 47 to the semi-rigid support 48 positioned at 49 and 50 to the bracket 51. The support 48 is reduced at 52 and 53 to allow the support to flex. The other end of the arm 46 engages the wire 55 mounted in the fastening block 56. The wire 55 engages the rod 57, engaging the flexure tension support 60 which engages the arm 61 mounted by a pair of flexures 63 and 64 to a bracket 65. The arm 61 carries a pair of magnets 66 and 67 adapted to control sensitive magnet operated electrical switches 68 and 69 mounted on the bracket 70. The movement of the arm 61 toward the front plate is limited by the spring 71 and the arm carries a set screw 72 which contacts the yoke 42.

The yoke 42 is pivoted at one side to the pin 73 on the bracket 51 and at the other side to the bracket 65. A spring 74 tends to position the yoke inwardly towards the plate in contact with the slug 40. The operating handle 75 carrying the cam 41 is pivoted on the bushing 76, which extends through the plate 25 and which carries the setting knob 36. Shown in Fig. 2 the operating handle 75 is placed in the upward position so that the ventilators are free to open to the fullest extent, while placed in the downward position they will remain closed. If the temperature setting knob is turned to manual the ventilators may be opened or closed fully or in part by the manipulation of the operating handle 75. When the temperature setting dial is set to a temperature reading the operation of the device is automatic but will be limited by the setting of the operating handle. As heretofore stated, one end of the thermal element 30, is rigidly attached to a small, stainless steel rod 32 which on the end nearest the element is threaded into a collar 33 which holds one end of the safety spring 34. The other end 35 of the rod 32 contains a small flange and can be seen projecting through the temperature setting knob 36 (see Fig. 7).

In practice, a tension of about 10 pounds is used to hold this rod in extended position with more than enough force to operate the mechanism. If the temperature increases to more than the setting the spring will be compressed by the collar 37, due to the setting, to allow the temperature element free longitudinal expansion. Allowance is made for setting the control on manual and allowing the ambient temperature to reach 130 degrees Fahrenheit. The two-to-one lever with the flexure tension supports serves to double the motion and also serves to leave the temperature element well ventilated and away from surrounding parts which would interfere with its sensitivity. The motion is again multiplied by the flexure mounted arm carrying the magnet which operates the magnetic switch. The upper limits set for the ventilating sash are controlled by the cam 41 mounted on the operating handle 75.

If, for instance, the operating lever was set at the halfway mark and the temperature dial at 70, the device would begin to operate when the temperature was raised to above 70 degrees to open the ventilator. When the limit controlled by the operating handle is reached the slug 40 in the collar 39 actuated by the modulating arm 43 would ride over the cam and thus engage the yoke 42 which in turn would exert pressure on the set screw 72 and through it to the arm 61, thus operating the switch 69 to shut off the motor. The action of the modulator arm 43 is to back off the thermal element base as the sash rises and to require high temperature to further actuate this ventilator. This operates by turning the hollow sleeve 38 and rotating the entire unit. In practice the sleeve 38 is threaded with a 24 thread. The temperature regulating knob operates on a 12-thread but as it backs off the rod 32, its travel is equivalent to a 24-thread. The bushing 76 holding the knob 36 can be unlocked by releasing the locking nut 77 for calibration purposes. By the same token when the temperature falls below the setting, the temperature responsive element 30 will contract, thus reducing the tension on the arm 46 and the rod 57, allowing the opposite switch to close to reverse the motor and start the ventilator closing. This, in turn, moves the modulating arm downwardly and rotates the collar 39 to move the pin 40 along the face of the cam 41 to adjust the setting. It will be appreciated that very minute changes in temperature will be reflected in the control.

Referring to the circuit the motor is controlled by the relay 78. The switch 68 is shown closed. The current flows through this switch, through the mercury switch 79 to the relay 78 and into the motor. When the ventilator is opened to a point where the slug 40 engages the yoke 42 to move the arm 61 into a neutral position, the action stops. The mercury switch 79 is designed to prevent jamming of the ventilators in the event the motor should not cut off in closing them. This breaks the circuit.

While we have shown what we consider to be a preferred form of our invention it will be appreciated that many modifications may be made without departing from the basic conception which includes the manual and automatic control and the modulating features which give it such accuracy and reliability.

We claim:

1. In a control having a temperature responsive element, a pair of switch members, an arm adapted to operate either of said switch members, manual means for operating said switch members, additional means adjustable by a temperature setting knob connected through resilient means to one end of said temperature responsive element and operated thereby, means connecting the opposite end of said temperature responsive element to said arm whereby the expansion or contraction of the temperature responsive element is transmitted to said arm to operate said switches.

2. In a control having a temperature responsive element a pair of switch members, an arm adapted to operate either of said switch members, manual means for operating said arm, means operatively connected to one end of the temperature responsive element to adjustably position it, means connecting the other end of said temperature responsive element to said arm, said means consisting of a bar pivotally connected to said temperature responsive element, a flexure device on one end of said bar joined to a rigid support and a member connecting the opposite end of said bar by means of a double flexure device to said arm.

3. In a control having a temperature responsive element a pair of switch members, an arm adapted to operate either of said switch members controlled by the expansion and contraction of said temperature responsive element, manual means for operating said arm comprising an operating handle, a beveled cam positioned on said handle, a yoke operatively connected to said arm, resilient means limiting the movement of said yoke, contact means between said cam and said yoke whereby the movement of the operating handle is transmitted to said arm, means connected to said temperature responsive element for actuating said arm and means for adjusting the position of said temperature responsive element to cause its operation at predetermined temperatures.

4. In a control having a temperature responsive element, the improvement which consists of, said element being supported by a rod at one end and an arm at the opposite end, one end of said arm being fastened by a flexure device to a rigid support, the other end of said arm being operatively connected to a switch arm, a pair of switches operated by said switch arm, a spring on said rod, manual means for varying the pressure on said spring, a threaded sleeve on said rod, and additional means mounted on said sleeve to vary the pressure on said spring, whereby expansion and contraction of the temperature responsive element causes said flexure device to actuate said switch arm.

5. In a control, having a temperature responsive element, the improvement which consists of a pair of switch members, an arm adapted to operate either of said switch members controlled by the expansion and contraction of said temperature responsive element, manual controlled means consisting of an operating lever, a bevelled cam positioned on said lever, a yoke operatively connected to said arm, contact means between said arm and said yoke consisting of a slug slidably mounted in a collar whereby movement of the operating handle is transmitted to said arm, means adjustably connected to said temperature responsive element and means for adjusting said connection to a pre-determined temperature at which said temperature responsive element will operate said arm.

6. For use in conjunction with a responsive element, a control comprising switches, an arm adapted to cooperate with said element, a semi-rigid structure connected with one end of said arm supporting it for movement in opposite directions, a rod, a switch-operating arm, the opposite ends of said rod connected by flexible means with the remaining end of said first mentioned arm, and the switch operating arm, flexible means supporting the switch operating arm for pivotal movement so that movement of the first-mentioned arm in response to the action of said temperature responsive element causes said switch-operating arm to close and open the switches upon pivotal movement of said switch arm.

7. A control for controlling the movement of a device comprising a base, a temperature responsive element having one end connected to a rod extending through said base and through a setting knob mounted in said base, a sleeve on said rod having one end threaded into said knob, a spring compressed between said sleeve and said temperature responsive element whereby the pressure on said spring may be varied, a bar on the opposite end of said rod, one end of said bar being fixed to a support, means on the other end of said bar to connect said bar to an arm, a pair of switch members operated by said arm whereby expansion and contraction of the temperature responsive element will cause said arm to operate said switches and means operated by the device to be controlled to limit the operation of said temperature responsive element.

8. A control for controlling the movement of a device comprising a base, a temperature responsive element having one end connected to a rod extending through said base and through a setting knob mounted in said base, a sleeve on said rod having one end threaded into said knob, a spring compressed between said sleeve and said temperature responsive element whereby the pressure on said spring may be varied, a bar on the opposite end of said rod, one end of said bar being fixed to a support, means on the other end of said bar to connect said bar to an arm, a pair of switch members operated by said arm whereby expansion and contraction of the temperature responsive element will cause said arm to operate said switches and means operated by the device to be controlled to limit the operation of said temperature responsive element by rotating said threaded sleeve to increase or decrease the pressure on said spring.

WILLIAM BARTON EDDISON.
THOMAS E. KING.

REFERENCES CITED

The following references are of record in the file of this patent:

UNITED STATES PATENTS

| Number | Name | Date |
| --- | --- | --- |
| 589,603 | King | Sept. 7, 1897 |
| 1,244,184 | Dunwoodie | Oct. 23, 1917 |
| 2,353,692 | Cunningham | July 18, 1944 |

FOREIGN PATENTS

| Number | Country | Date |
| --- | --- | --- |
| 305,962 | Great Britain | Feb. 5, 1929 |